Patented May 4, 1937

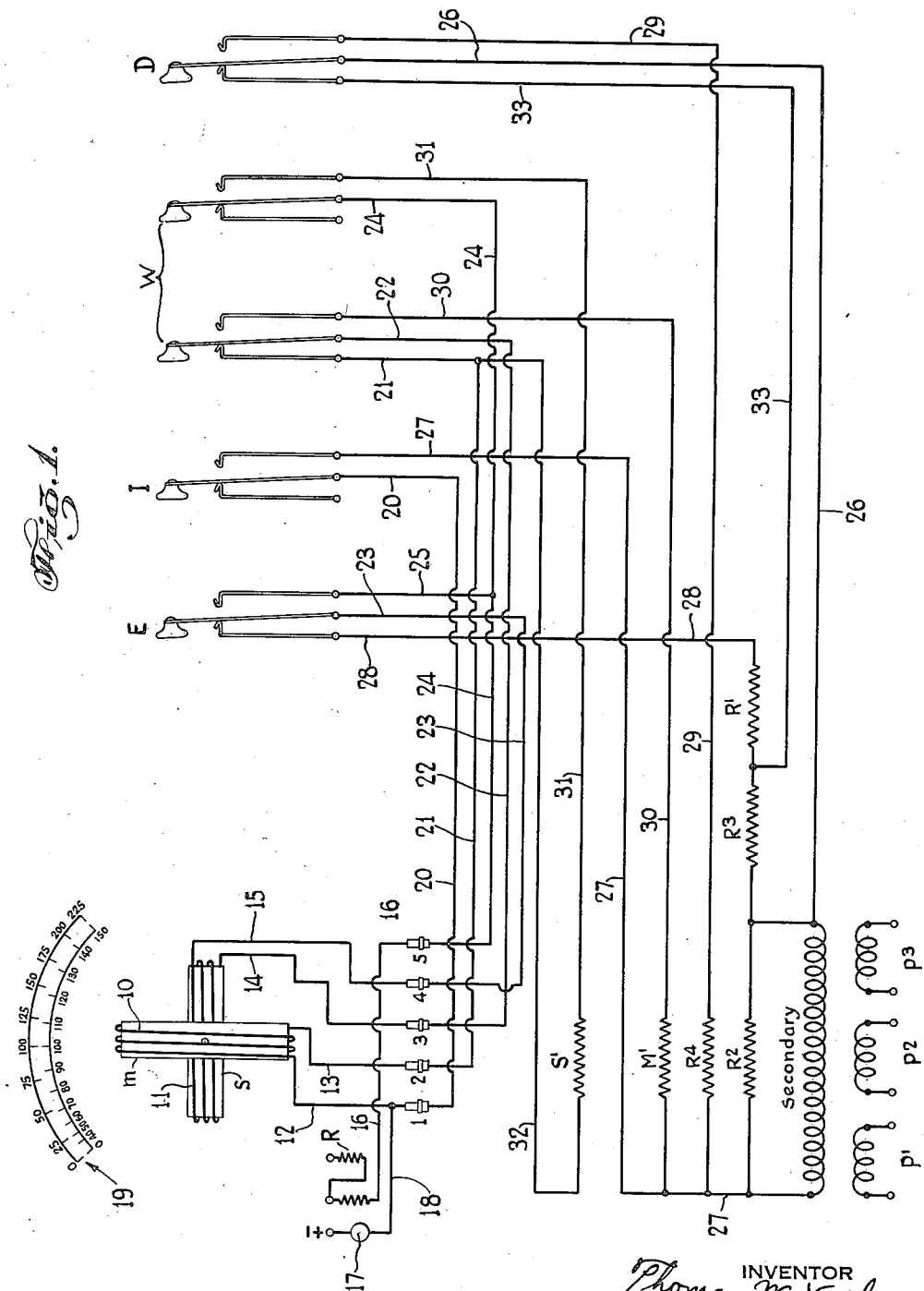

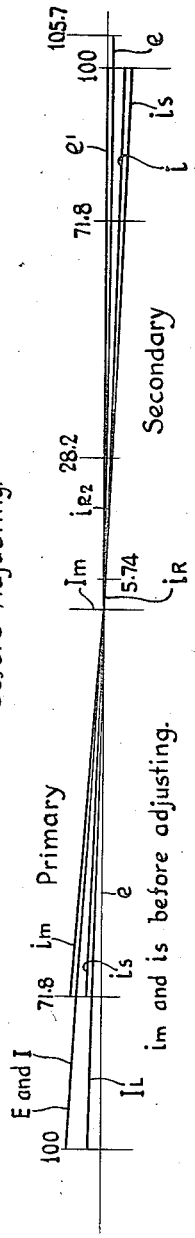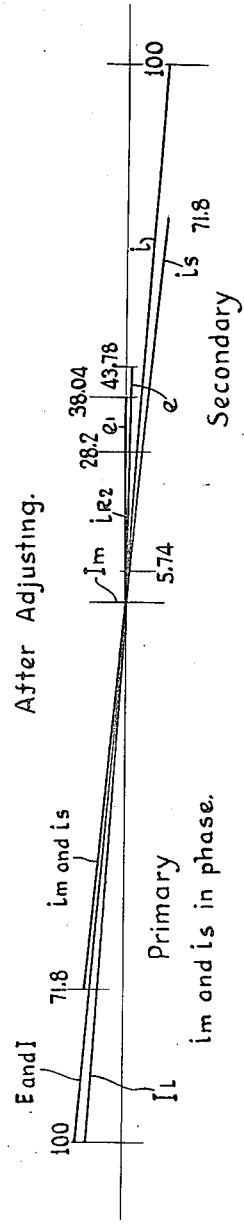

2,079,472

UNITED STATES PATENT OFFICE 2,079,472

ELECTRICAL MEASURING INSTRUMENT

Thomas W. Varley, New York, N. Y.

Application July 1, 1935, Serial No. 29,268

9 Claims. (Cl. 171—95)

This invention relates to a new and useful improvement in a method of using a transformer in combination with a voltmeter, watt meter, or watt-hour meter so that readings of volts, amperes, or watts may be readily taken by the mere pressing of suitable keys or switches.

A main object of the invention is to provide a method and apparatus in which the usual phase angle error and turn ratio error of the transformer is eliminated.

A further object of the invention is to provide a method and apparatus in which the capacity of the apparatus for reading current and watts can be doubled merely by pressing an extra key or switch.

Further and more specific objects, features, and advantages will more clearly appear from a consideration of the specification hereinafter when taken in connection with the accompanying drawings which form part of the specification and which illustrate a present preferred form which the invention may assume.

In a general contemplation of the invention, it includes a voltmeter, preferably of the dynamometer type with a movable and a stationary coil, disposed in a circuit with a transformer, preferably of the series type with its secondary shunted with a resistance and in circuit to provide a predetermined current to the coils of the meter for full load deflection of the meter needle. The transformer is provided with a plurality of primaries capable of handling loads of various ranges such as up to 1.5 amps., 15 amps., and 150 amps. By predetermining the value of the shunt resistance the turn ratio can be corrected. By means of this shunt resistance and by the use of compensating or balancing resistances, some in series with and some in parallel with the secondary of the transformer and the coils of the meter the turn ratio is corrected and the phase angles between the various currents and voltages, especially the phase angle between the current in the moving and the stationary coils of the meter, can be controlled.

More specifically recited, the secondary of the transformer is shunted by a resistance, and is in series with a pair of resistances, one of which is in circuit when the meter is to read amperes and watts, and both of which are in circuit when the capacity of the reading is to be doubled. Another resistance is placed in parallel with the secondary shunt when the double capacity reading takes place either for amperes or watts. Also when the meter is to read watts certain balancing resistances are placed in circuit in series respectively with the stationary and the moving coil of the meter. However all of these variations in the disposition in the circuit of the various resistances for the various purposes mentioned are effected by means of a series of switches the manipulation of which effect the desired reading after the elements of the circuit have been initially adjusted and calibrated. For instance one switch element is pressed when the meter is to read volts, another is pressed when the meter is to read amperes, and still another is pressed when the meter is to read watts, and yet another when the reading of either the amperes or the watts is to be used with a double constant so as to double the capacity of the meter.

The present preferred form which the invention may assume is shown in the figures of which:

Figure 1 is a diagrammatic representation of the meter, the transformer, the operating keys, and the circuit connections therebetween: Fig. 2 is a vectorial diagram of the various potential and current relations before adjustments are made; and, Fig. 3 is a similar view after adjustments are made.

In the drawings, the present preferred form of the invention indicates a meter having a movable coil 10 and a stationary coil 11, lettered respectively "m" and "s". Wires 12 and 13 from coil "m" extend to separable terminals 1 and 2. Wires 14 and 15 from coil "s" extend to terminals 3 and 4. A terminal 5 is connected to wire 16 connected to the usual resistance "R" associated with a voltmeter. The usual voltmeter key 17 is connected by wire 18 to terminal 1. The voltmeter is provided with a dial 19 calibrated on a lower scale in terms of volts or amperes and on an upper scale in terms of watts. A separate scale of watts may be provided to attach to the meter if desired.

The five terminals mentioned are preferably separable in type so that the meter can be quickly disconnected by merely pulling the terminals apart. The terminals 1 to 5 inclusive are connected through their other separable portions with wires 20 to 24 inclusive respectively.

Associated in this invention are four switch elements lettered respectively "E", "I", "W", and "D". Each switch comprises a central movable key member and right and left hand contacts associated therewith. The switch "W" comprises two key members with each having the above mentioned right and left hand contacts. The two keys in the "W" switch are connected by a fixed connection not shown so that when one key is moved the other will move with it.

Terminal 1 is connected by wire 20 with the key element of switch "I". Terminal 2 is connected by wire 21 with the left hand contact of the left hand key of switch "W". Terminal 3 is connected by wire 22 to the left hand key element of switch "W". Terminal 4 is connected by wire 23 to the key element of switch "E". Terminal 5 is connected by wire 24 to the right hand key of switch "W" and by wire 25 to the right hand contact of switch "E".

A transformer is associated with the circuit and has three primaries P1, P2, and P3. Associated with the primaries is a secondary which we will name "sec". A resistance R2 is shunted across the ends of the "sec". A wire 26 connects one end of the "sec" to the key switch "D". A wire 27 connects the other end of the "sec" to right hand contact of switch "I". Resistances R1 and R3 are in series with each other and with the shunt circuit formed by the "sec" and the resistance R2, and are connected by wire 28 to the left hand contact of switch "E". A resistance R4 is connected at one end to wire 27 and at the other by wire 29 to the right hand contact of switch "D". A resistance M1 is connected at one end to wire 27 and at the other end by wire 30 to the right hand contact associated with the left hand key of switch "W". A resistance S1 is connected at one end by wire 31 to the right hand contact associated with the right hand key of switch "W", and at the other end by wire 32 to wire 21 near the switch "W". A wire 33 extends from a point between the resistances R3 and R1 to the left hand contact of switch "D".

The voltmeter used in the circuit is preferably of the dynamometer type and has a moving coil 10 called "$m$" and a stationary coil 11 called "$s$", and a card resistance called R together with the usual key 17 to place the meter in circuit only when the key is pressed. When used as a voltmeter the current in the coil $m$ is called $im$ and the current in the coil $s$ is called $is$ and are in series and therefore in phase although the current lags with respect to the applied voltage E. The meter is calibrated under these conditions to read in terms of E. The meter selected has a scale reading from 0 to 150.

The transformer used has three primary coils, one of 100 turns, a second of 10 turns, and a third of one turn. The secondary has 3000 turns. The transformer is designed to give 150 volts and .05 ampere secondary output. The secondary ampere turns being 150, assuming effective amperes the primary ampere turns is also 150 for each primary coil used. These values are selected to match the voltmeter scale of 150 divisions at full load of the primaries of 1.5, 15, and 150 amperes respectively. The impedance of the voltmeter is 4180 ohms, giving .0359 ampere for a deflection of 150 divisions or 150 volts.

The secondary volts of the transformer with a total generated voltage of $e$ volts and an output voltage of $e1$ is made to give .0359 ampere to the meter at full load of the primary such as 1.5 amperes when that primary coil is used. The balance of the secondary current of about .0141 ampere serves to adjust the meter. The secondary current to the meter passes through coils $m$ and $s$ in series when amperes are to be read and the secondary impedance is made to allow .0359 ampere at $e1$ volts. In this case a second card resistance R1 is used and the resistance R omitted. The phase angle between the secondary current to the meter and the output voltage $e1$ is not important but the turn ratio may be and is corrected for by a resistance R2 carrying the shunt current of about .0141 ampere. When the meter is used to read watts the current of coil $m$ is kept to .0359 ampere by using a resistance called $s1$ to replace the impedance of coil $s$ and the resistance R, total impedance being as before, 4180 ohms. In this case the phase angle between E and $im$ is now of importance. The tangent of the angle between E and $im$, called tan $im$ is 1.16%, actually .0116. This tan $im$ of 1.16%, remains constant as to its effect in adjustments made in using the transformer when making other corrections and is a lagging effect of $im$ relative to E.

It will be assumed that all readings of the voltmeter scale refer to full scale of 150 divisions, as a voltmeter 150 divisions means 150 volts, as an ammeter 150 divisions means 150 amperes, 15 amperes, or 1.5 amperes depending upon which primary coil is in use. As a wattmeter 150 divisions means 225, 2250, 22,500 watts. The wattmeter scale is the square of the ordinary divisions times a constant. A special scale may be placed alongside the regular scale to read watts instead of computing from the ordinary scale.

The current to coil $s$ or "$is$" is from the transformer secondary volts $e$, and for a value of $e$ of about 150 volts and a current $is$ of .0359 ampere, the impedance is 4180 ohms. The impedance is formed by a resistance $m1$ to replace the coil $m$, the coil $s$, and the resistance R1. Current $is$ lags relatively to $e1$, at a tan of 3.182%. Under these conditions, assuming a total secondary current of .05 ampere, the $is$ current is 71.8% of total. The combined currents of $is$ and $iR2$ give a current called $i$ at a tan of 3.82×.718 or 2.74% relative $e1$. The transformer secondary resistance is 172 ohms giving an $ir$ drop of 8.6 volts or 5.74% of the $e$ of 150 volts, which $is$ figures 100%. The total secondary volts generated being 100%, the output volts $e1$, becomes 94.26%. The angle between $e1$ and $e$ is negligible. Actually the angle between $e$ and $e1$ is at tan 2.74×.0574 equals .157% and the cos equals 1 for all practical purposes.

Due to the $e1$ being 94.26% the impedance of coil $s$ circuit becomes 3940 ohms. This impedance consists of a fixed inductance due to coil $s$ and the resistance of the coil plus other resistances, giving a change of tan $is$ to $e1$ of 4.05%. Tan $i$ to $e$ is now 2.91%. Tan $e1$ to $e$ is .167%. Tan $i$ to $e$ is 2.91—.167 equals 2.743%. The current $i$ of secondary is balanced by the current I1 of the primary.

The magnetizing effect of the primary to give a 100% is 3.8%. This is divided into two parts, .218% for the $ir$ drop, and 3.582% for the output effect. The $ir$ part of .218% will be constant, or will be assumed constant. The load power factor as assumed 1.00 and the E and I of load in phase.

Tan $im$ to E is 1.16% and is the same to I. Tan I to $e$ equals 2.743 plus 3.582 plus .218 equals 6.541%. Tan $im$ to $e$ equals tan I plus 1.16 equals 6.541 plus 1.16 equals 7.701%. Tan $is$ to $e$ equals 4.05—.167 equals 3.883%. It will be seen that tan $is$ and tan $im$ are not in phase.

Tan I1 to $e$ of 2.743% is 1 degree and 34 minutes. Im to $e$ is 90 degrees. Difference between tan I1 and Im is 90 degrees minus 1 degree and 34 minutes equals 88 degrees and 26 minutes, cos equals .02743. I equals 100%. Im is 3.8% giving I1 of 99.83%. I1 equals sum of $is$ and $iR2$ vectorially. Tan $I_1$ to $e_1$ equals 4.05% giving cos .9992 and $e_1$ are in phase. In $i_s$ there is no change. $IR_2$ is now 28.09%. This corrects for the turn ratio.

In order to make $i_m$ and $i_s$ in phase we assume that

Tan $i_s$ to $e_1$ equals $4.05 \times$ a constant $n$.
Tan $i$ to $e_1$ equals $4.05 \times .718$ equals $2.91n$.
Tan $e^1$ to $e$ equals $2.91n \times .05736$ equals $.167n$.
Tan $i$ to $e$ equals $2.91n$ minus $.167n$ equals $2.743n$, also
Tan $I_1$ to $e$ equals $2.743n$. As tan $i_s$ changes, the volts to a circuit changes inversely and as the impedance of a circuit changes.

The $I_m$ necessary to give the secondary output volts $e_1$ changes as $$\frac{3.582}{n} \times \frac{1 \text{ plus } in \times \frac{e}{r}}{1 \text{ plus } j \times \frac{e}{r}}$$

where $$\frac{e}{r}$$

is the original tan $i_s$ equals 4.05%.
The ratio $$\frac{1 \text{ plus } jn \times .0405}{1 \text{ plus } j \times .0405}$$

for an assumed value of $n$ equals 2.5 is $$\frac{1 \text{ plus } j2.5 \times .0405}{1 \text{ plus } j \times .0405}$$

equals $$\left(\frac{1 \text{ plus } \frac{2}{.1013}}{1 \text{ plus } .00164}\right)^{\frac{1}{2}}$$

equals $$\frac{1.01026}{1.00164}$$

equals 1.01. Therefore $$\frac{3.582}{n} \times 1.01$$

equals $$\frac{3.62}{n}$$

$I_m$ total equals $$\frac{3.62}{n}$$

plus .218. Tan $I$ to $e$ equals tan $I_1$ plus $I_m$ equals $2.743n$ plus $$\frac{3.62}{n}$$

plus .218. Tan $i_m$ to $e$ equals tan $I$ plus 1.16 equals $2.743n$ plus $$\frac{3.62}{n}$$

plus 1.378. Tan $i_s$ to $e$ equals $4.05n$ minus $.167n$ equals $3.883n$. $3.883n$ equals $2.743n$ plus $$\frac{3.62}{n}$$

plus 1.378, $n$ equals 2.484. Therefore,

Tan $i_s$ to $e_1$ equals $4.05 \times 2.484$ equals 10.07%.
Tan $i$ to $e_1$ equals $2.91 \times 2.484$ equals 7.22%.
Tan $e_1$ to $e$ equals $.167 \times 2.484$ equals .415%.
Tan $i$ to $e$ equals 7.22 minus .415 equals 6.805%.
Tan $I_L$ to $e$ equals 6.805%.
$I_m$ equals $$\frac{3.62}{2.484}$$

plus .218 equals 1.458 plus .218 equals 1.676%.
Tan $I$ to $e$ equals 6.805 plus 1.676 equals 8.481.

Tan $i_m$ to $e$ equals 8.481 plus 1.16 equals 9.641.
Tan $i_s$ to $e$ equals 10.07 minus .415 equals 9.655.
therefore $i_s$ and $i_m$ are substantially in phase.

The secondary volts $e$ due to $I_m$ are $$150 \times \frac{1.676}{3.8} \; 66.16$$

volts.

The secondary output volts $e_1$ are $$150 \times \frac{1.458}{3.8}$$

equals 57.1 v.

The load to the wattmeter stationary coil $s$ in amperes "$i_s$" .0359. The impedance is $$\frac{57.1}{.0359}$$

equals 1592 ohms. Also the lag of this load is at tan 10.07% to $e_1$ equals $$\frac{e}{r}.$$

$L$ equals $159.5r$ equals $$\frac{159.5}{.1007}$$

equals 1585 ohms. 1585 plus $j159.5$ equals 1590 ohms. Using this value for $m_1$ plus $R_1$ plus $s$, or $m_1$ plus $R_1$ plus 258 plus $j159.5$ equals 1585 plus $j159.5$. $M_1$ plus $R_1$ equals 1327 ohms. $iR_2$ the shunt current is in phase with $e_1$ and $\tan^{-1} .1007$ to "$i_s$" giving, when added, $i$ equals 99.83% ... angle $\cos^{-1} .995$ between $IR_2$ and $i_s$. $Ir_2$ is difference between 99.83% and 71.8% vectorially which is 28.16%, or $.05 \times .2816$ equals .01408 ampere. $R_2$ equals $$\frac{57.1}{.01408}$$

equals 4055 ohms.

When the instrument is used as an ammeter the $m_e$ and $s$ coils are in series with resistance $R_1$ and across $e_1$ volts. The current is .0359 ampere and the impedance is $$\frac{57.1}{.0359}$$

or 1590 ohms, therefore $M$ plus $R_1$ equals 1590 ohms. $M$ plus $S$ equals 364.6 plus $j219$. $R_1$ plus 364.6 plus $j219$ equals 1590 ohms. Therefore $R_1$ equals 1211.4 ohms. $M_1$ plus $R_1$ equals 1327, therefore $M_1$ equals 115.6 ohms.

Advantage can be taken of this procedure to give other ranges to the secondary such as two to one, three to one etc. The method of obtaining a two to one ratio is described below:

A secondary current of $2 \times .05$ or .1 amp. is to be used where the $i_s$ current is 35.9%. The shunt current takes the difference as $IR_2$ is now about 64.1%. The secondary drop $Ir$ is now $2 \times 5.736$ or 11.47%.

Using the same procedure of calculations as before the resistance $R_1$ is increased by adding another resistance in series called $R_3$ and the resistance $R_2$ decreased by shunting with another resistance called $R_4$. From the single reading $M_1$ plus $R_1$ equals 1327 ohms. $R_1$ equals 1211.4 ohms. $M_1$ equals 115.6 ohms. $R_2$ equals 4055 ohms.

From the double reading $M_1$ plus $R_1$ plus $R_3$ equals 2337 ohms. $M_1$ plus $R_1$ equals 1327 ohms therefore $R_3$ equals 1010 ohms. $R_2$ and $R_4$ in parallel equal 2075 ohms. $R_4$ equals 4200 ohms.

This gives a capacity range for amperes and watts of 1.5 and 3. amps.—15 and 30 amps.—150 and 300 amps.

In Figure 1 the voltage is read by pressing the key 17 and operating switch E. The amperes are read by pressing switch I and the reading is halved by pressing switch D also. The watts are read by pressing switch W—a single toggle—and the reading is halved by pressing switch D also.

In the circuit shown in Fig. 1, when a volt reading is desired, the key 17 and the switch E are pressed down. The circuit is then as follows: From the key 17, wire 18, wire 12, moving coil m, wire 13, terminal 2, wire 21, left hand contact of left side of switch W, left hand switch W, wire 22, terminal 3, wire 14, coil s, wire 15, terminal 4, wire 23, switch E, right hand contact of switch E, wire 25, to terminal 5, wire 16, to card resistance R to the other side of the voltage circuit.

When current is to be read, then the switch I is closed together with the key 17 and the circuit is as follows: From the secondary "sec" of the transformer, wire 27, right hand contact of switch I, switch I, wire 20, terminal 1, wire 12, coil m, wire 13 terminal 2, wire 21, left hand contact of left hand switch W, left hand switch W, wire 22, terminal 3, wire 14, coil s, wire 15, terminal 4, wire 23, switch E, left hand contact of switch E, wire 28, resistance R1, wire 33, left hand contact of switch D, switch D, wire 26, back to the other end of the transformer "sec". The balance of the secondary current also goes through the resistance R2 in shunt with the transformer "sec". To halve the meter current or double the constant press the switch D also with the depression of switch I. In this case the circuit from wire 28 is then through resistance R1, resistance R3, and resistance R4 is put in parallel with the resistance R2 through wire 29, right contact of switch D, switch D, and wire 26.

When the meter is to read watts, then the key 17 is pressed together with the switch W and the circuit is as follows:—the potential circuit is from key 17, wire 18, wire 12, coil m, wire 13, terminal 2, wire 21, wire 32, resistance s1, wire 31, right hand contact of right hand switch W, right hand switch W, wire 24, terminal 5, wire 16 to card resistance R to the other side of the potential circuit. The current circuit, is from the transformer "sec" wire 27, resistance m1, wire 30, right hand contact of left hand switch W, left hand switch W, wire 22, terminal 3, wire 14, coil 3, wire 15, terminal 4, wire 23, switch E, left hand contact switch E, wire 28, resistance R1, wire 33, left hand contact of switch D, switch D, wire 26, back to the other end of the transformer "sec". In this case also when the switch D is also pressed, the current is halved and the constant is doubled by the insertion of the resistance R3 in series with the resistance R1, and the insertion of resistance R4 in parallel with the resistance R2.

It will thus be apparent that I have provided a new and useful method and combination of well known apparatus so united and cooperatively related as to produce a new and useful result in regard to meter readings of various kinds. It is also apparent that the readings thus given are unusually accurate in view of the manner in which the various errors usually encountered are corrected for under all conditions of use. It is also clear that the operation of the device after the initial calibration and adjustment of the parts is almost automatic requiring merely the depression of the proper key or switch to effect the desired reading. It is also observable that the combination forming this novel unit is capable of a wide range of readings especially when used as an ampere or watt meter in which the doubling constant may be introduced to increase the capacity of the device.

While the invention has been described in detail and with respect to a present preferred form which the invention may assume, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What I claim is:

1. In combination a transformer having a primary and a secondary coil, a meter having a movable and a stationary coil only, a predetermined resistance in shunt with the secondary coil, a second resistance in series with the secondary coil, and circuit operating means to place the coils of the meter in series with each other and with the second resistance and the secondary of the transformer when the meter is to read amperes.

2. In combination a transformer having a primary and a secondary coil, a meter having a movable and a stationary coil only, a variable resistance in shunt with the secondary coil, a second resistance in series with the secondary coil, a circuit operating means to place the coils of the meter in series with each other and with the second resistance and the secondary of the transformer when the meter is to read amperes, a third resistance in series with the second resistance, a fourth resistance in parallel with the shunt resistance, and a circuit operating means to place said third and fourth resistance in circuit in one position and to open the circuit to said resistance in another position.

3. In combination a transformer having primary and secondary coils only, a meter having a movable and stationary coil, a resistance in shunt with the secondary of the transformer, a plurality of other resistances in circuit with the meter and the secondary, switch means to operatively and selectively associate the other resistances with the meter coils and the secondary, whereby the meter may read volts, amperes, or watts, the values of the resistances being predetermined whereby the turn ratio of the transformer is corrected for and the phase angles between desired currents and voltage factors is maintained at desired values under all load conditions.

4. In combination a transformer having a primary and a secondary coil, a meter having a movable and a stationary coil only, a resistance in shunt with the secondary and of predetermined value, a resistance adapted to be disposed in series with the movable coil, a resistance adapted to be placed in series with the stationary coil, other resistances in series with the above resistances, and switching means to so associate said elements when the meter is to read predetermined values, all of said resistances being of predetermined value.

5. In combination a transformer, and a meter having a movable and a stationary coil only, resistance means in circuit therewith, said resistances being of predetermined value to correct for the turn ratio of the transformer and to render zero the phase angle between the current in the movable and the stationary coils of the meter when the meter is connected to read watts and when the load power factor is 1.00.

6. In combination, a transformer having a secondary coil in circuit with the coils of a meter, means in shunt with the secondary coil and of predetermined value to correct for the turn ratio of the transformer, and other means of predetermined value in circuit with the secondary and the meter coils whereby desired phase angles are controlled.

7. In combination, a transformer having a primary and a secondary coil, a meter having coils in circuit with the secondary, and a plurality of means in circuit with and between the secondary and the meter coils and of predetermined value whereby the constant of the meter may be changed without changing the phase angle between the primary current and the secondary current as supplied to the meter.

8. A combined voltmeter, ammeter, and wattmeter instrument with a common calibrated scale to indicate relative volts, amperes, and watts which comprises a series transformer having a secondary coil, a resistance of predetermined value in shunt with the secondary coil, and a resistance of predetermined value in series between the secondary coil and the coils of the meter to correct for the error of turn ratio of the transformer when indicating amperes or watts and also to correct for phase angle error when reading watts.

9. A wattmeter in combination with the secondary coil of a transformer, said wattmeter having an ampere element and a volt element, and means in circuit with a secondary coil and the meter coil elements for bringing the current as supplied to the ampere element of the meter in proper phase relation to the current as supplied to the volt element of the meter.

THOMAS W. VARLEY.